US012759386B2

(12) United States Patent
Favaretto

(10) Patent No.: US 12,759,386 B2
(45) Date of Patent: Oct. 13, 2026

(54) ELECTRIC OR HYBRID CAR WITH IMPROVED PASSENGER COMPARTMENT

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 305 days.

(21) Appl. No.: 18/588,110

(22) Filed: Feb. 27, 2024

(65) Prior Publication Data

US 2024/0294061 A1 Sep. 5, 2024

(30) Foreign Application Priority Data

Mar. 2, 2023 (IT) ........................ 102023000003744

(51) Int. Cl.

| | |
|---|---|
| ***B60K 1/04*** | (2019.01) |
| ***B60N 2/005*** | (2006.01) |
| ***B60R 22/18*** | (2006.01) |
| ***B62D 25/04*** | (2006.01) |
| ***B62D 25/20*** | (2006.01) |

(52) U.S. Cl.

CPC ................ *B60K 1/04* (2013.01); *B60N 2/005* (2013.01); *B62D 25/04* (2013.01); *B62D 25/2036* (2013.01); *B60K 2001/0405* (2013.01); *B60R 22/18* (2013.01)

(58) Field of Classification Search

CPC .. B60K 1/04; B60K 2001/0405; B60N 2/005; B62D 25/04; B62D 25/2036; B60R 22/18

See application file for complete search history.

(56) References Cited

U.S. PATENT DOCUMENTS

| | | | | |
|---|---|---|---|---|
| 1,786,990 A * | 12/1930 | Gowan | ...................... | B60J 5/06 296/64 |
| 4,045,075 A * | 8/1977 | Pulver | .................... | B62D 21/08 280/798 |
| 4,747,636 A * | 5/1988 | Harasaki | ................ | B60R 22/04 296/203.03 |

(Continued)

FOREIGN PATENT DOCUMENTS

| | | | |
|---|---|---|---|
| CN | 111319681 A | 6/2020 | |
| DE | 10302212 A1 * | 8/2004 | ............. B60N 2/803 |

(Continued)

OTHER PUBLICATIONS

Italian Search Report for Application No. 202300003744; Filing Date: Mar. 2, 2023; Date of Mailing: Sep. 18, 2023; 8 pages.

*Primary Examiner* — Jacob B Meyer

(74) *Attorney, Agent, or Firm* — CANTOR COLBURN LLP

(57) ABSTRACT

Electric or hybrid car comprising an outer body having a floor; a passenger compartment formed inside said outer body between the front and rear wheels; wherein the floor comprises at least two oblique side members converging towards a central portion of the floor, which comprises a central node to which an end of each oblique side member is mounted; a central pillar extending within said passenger compartment between said floor and said roof and arranged at an intermediate longitudinal axis of the passenger compartment between said driver's position and said rear passenger's position; wherein the central pillar comprises a first end connected to a central node of the floor and a second end connected to the roof.

11 Claims, 5 Drawing Sheets

(56) References Cited

U.S. PATENT DOCUMENTS

| | | | | |
|---|---|---|---|---|
| 7,641,266 | B2 * | 1/2010 | Platto | B60H 1/0055 296/193.06 |
| 12,122,454 | B2 * | 10/2024 | Hara | B60N 2/01 |
| 2016/0137226 | A1 * | 5/2016 | Wolf | B62D 25/20 296/203.01 |
| 2023/0347987 | A1 * | 11/2023 | Manzoni | B62D 25/06 |
| 2024/0294061 | A1 * | 9/2024 | Favaretto | B60N 2/005 |
| 2025/0202014 | A1 * | 6/2025 | Favaretto | B60K 1/04 |

FOREIGN PATENT DOCUMENTS

| | | | | | |
|---|---|---|---|---|---|
| DE | 102004058345 | A1 | * | 6/2006 | B62D 23/00 |
| DE | 10302212 | B4 | * | 2/2010 | B60N 2/803 |
| EP | 1375310 | B1 | * | 11/2007 | B62D 29/041 |
| EP | 3674122 | A1 | | 7/2020 | |
| EP | 4269216 | A1 | * | 11/2023 | B62D 25/04 |
| JP | 2020117212 | A | * | 8/2020 | B60L 50/64 |
| JP | 2023164335 | A | * | 11/2023 | B62D 25/04 |

* cited by examiner

ELECTRIC OR HYBRID CAR WITH IMPROVED PASSENGER COMPARTMENT

CROSS-REFERENCE TO RELATED APPLICATIONS

This patent application claims priority from Italian patent application no. 102023000003744 filed on Mar. 2, 2023, the entire disclosure of which is incorporated herein by reference.

FIELD OF THE ART

The present invention relates to an electric or hybrid car with improved passenger compartment, in particular of the four- or five-seater type, to which the following description will make explicit reference without losing generality.

PRIOR ART

As known, a car has two front wheels and two rear wheels and comprises an outer body and a passenger compartment, formed within the outer body between the front and rear wheels.

In particular, four- or five-seater cars are known wherein, along each flank, it is possible to access the passenger compartment through two doors provided with windows; the passenger compartment is thus delimited by four side doors, two at the front and two at the back, a front windscreen, a rear window and a roof.

In more detail, each flank defines a front side door compartment and a rear side door compartment to house the front side door and the rear side door respectively.

In this type of cars, it is usually used a pillar which separates the front side door compartment from the rear side door compartment and to which the rear side door is hinged.

The two opposite pillars have both a structural function of stiffening the car chassis as well as a support function of fixing the seat belt restraint systems for the driver's position and for the front passenger's position.

Cars are also known wherein the two pillars subdividing the front and rear side door compartments of the two flanks have been removed. Thus, on each side of the car, the two front and rear side doors close one on the other.

This solution, however, while being advantageous as it allows the driver and passengers to get into and out of the car more comfortably, given that a single side door compartment is present on each flank, has a number of drawbacks.

In particular, it is always required to open and close the side doors in sequence.

Further, the removal of the pillars leads to a chassis structural weakening resulting in the need to increase the weight of the whole car.

In addition, due to the lack of pillars on the two flanks, it is required to install seat belt restraint systems on the inner side of side doors, which are burdened on by a greater weight due to the grater dimension of the components installed therein and due to the need to bear the loads of the restraint systems.

As regards electric drive, different architectures for battery packs are known. High-performance sports cars often require the lower part of the vehicle chassis to have a shape such as to fulfil predetermined structural mechanical requirements. Therefore, it is difficult to combine stiffness requirements, suitable battery protection and concurrently to remove the side pillars which further weaken the structure.

DESCRIPTION OF THE INVENTION

The aim of the present invention is to make a car which can simply and cost-effectively overcome the drawbacks described above and related to cars of the known type.

According to the present invention a car is made according to what claimed in the independent claims that follow and preferably, in any one of the claims directly or indirectly depending on the independent claims.

The claims describe preferred embodiments of the present invention forming an integral part of the present disclosure.

BRIEF DESCRIPTION OF THE DRAWINGS

The present invention will now be described with reference to the accompanying drawings, which show a non-limiting embodiment, wherein.

PREFERRED EMBODIMENTS OF THE INVENTION

Figure 1:
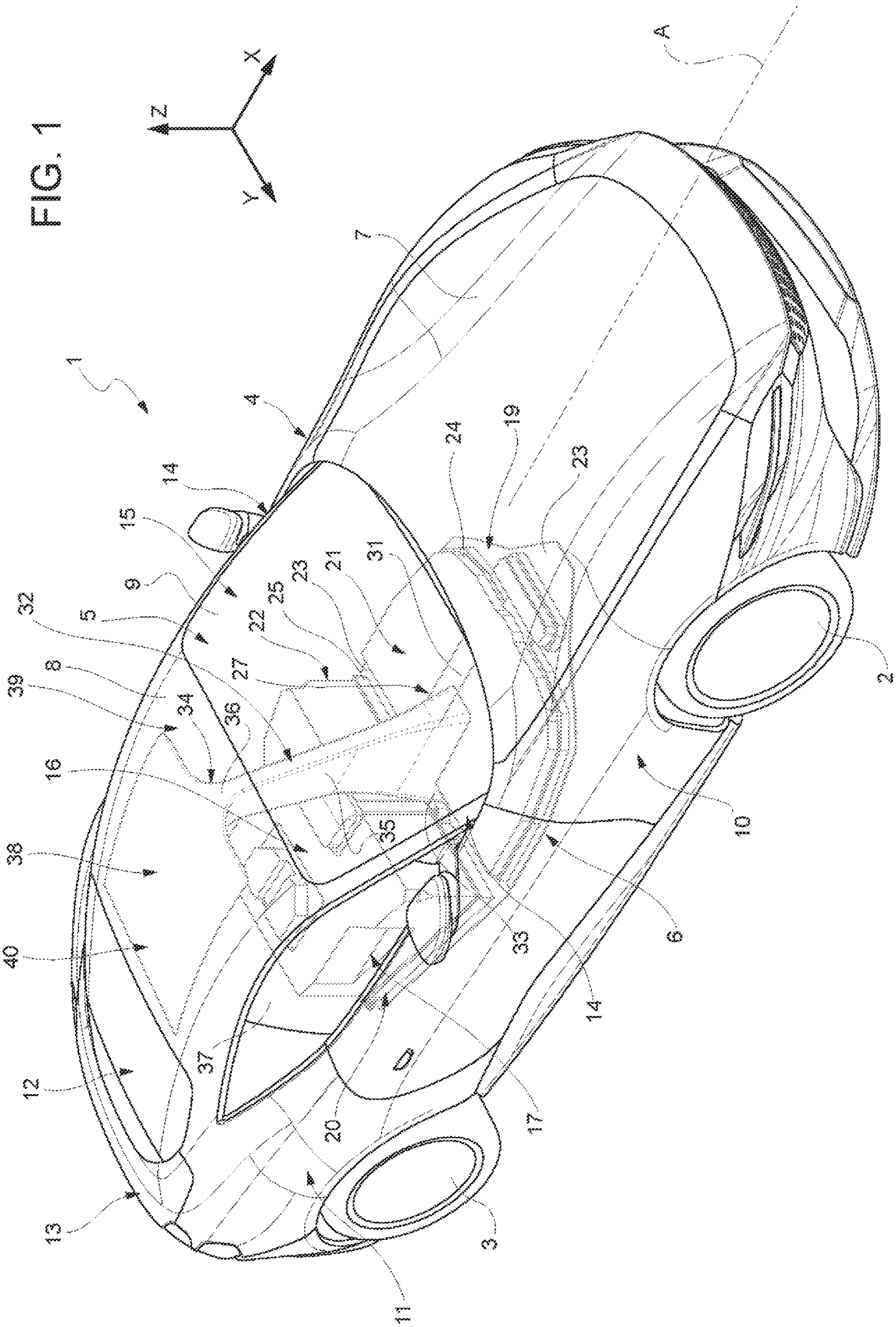
FIG. 1 is a perspective and schematic view, with parts removed for clarity's sake, of a car made according to the dictates of the present invention.
Figure 2:
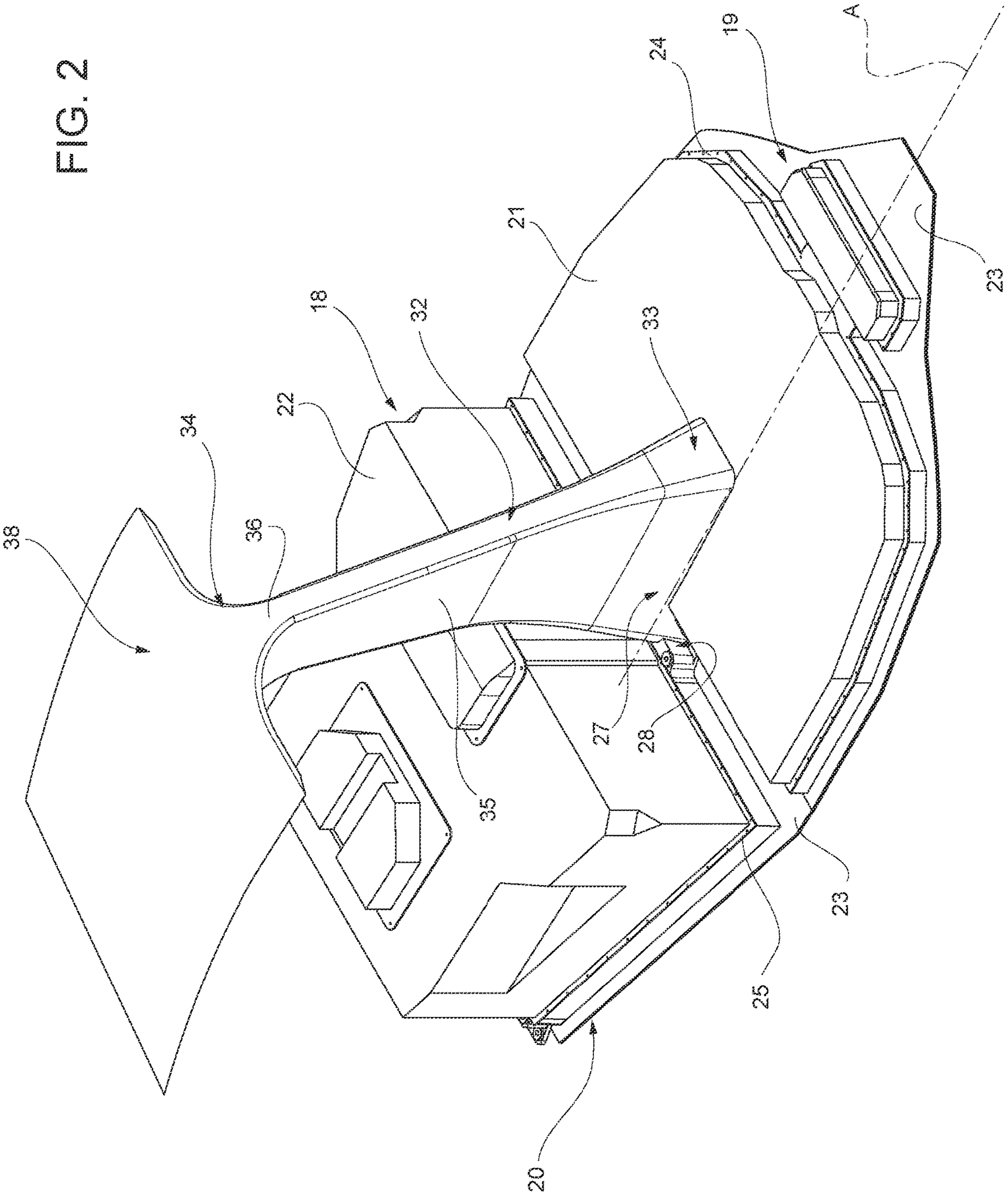
FIG. 2 is a perspective and schematic view, with parts removed for clarity's sake, of part in the inner structure of the car of FIG. 1, in particular of the battery pack and of a central pillar.

In FIG. 1, a car having two front wheels 2 and two rear wheels 3 and comprising an outer body 4 and a passenger's compartment 5, formed inside the outer body 4 between the front 2 and rear 3 wheels, is globally denoted by 1.

The same numbers and the same reference letters in the figures identify the same elements or components with the same function.

In the context of the present disclosure, the term "second" component does not imply the presence of a "first" component. These terms are in fact used as labels to improve clarity and should not be understood in a limiting way.

The elements and features shown in the various preferred embodiments, including the drawings, may be combined with each other without thereby departing from the scope of protection of the present application as described below.

It should be noted that in the hereinafter description, expressions such as "superiorly", "inferiorly", "at the front", "at the rear" and the like are used with reference to conditions of normal advancement of the road vehicle 1 along the normal advancement direction D.

As shown in the non-limiting embodiment of FIG. 1, it is also possible to define:

- a longitudinal axis X, integral with the car 1 and arranged, in use, horizontal and parallel to a normal advancement direction D of the vehicle 1;
- a transverse axis Y, integral with the car 1 and arranged, in use, horizontal and orthogonal to the axis X; and
- a vertical axis Z, integral with the car 1 and arranged, in use, vertical and orthogonal to the axes X, Y.

The outer body 4 comprises, among other things, a floor 6, a front bonnet 7, a roof 8 and a windscreen 9 extending between the front bonnet 7 and the roof 8.

In particular, the floor 6 extends between the front wheels 2 and the rear wheels 3.

The outer body 4 further comprises two front flanks 10, extending at the opposite sides of the front bonnet 7, and two opposite rear flanks 11, aligned with, and spaced apart from, the respective front flanks 10.

Finally, the outer body 4 comprises a rear window 12 and a rear bonnet 13.

The windscreen 9 joins inferiorly with the front bonnet 7 and superiorly with the roof 8. The windscreen 9 is further laterally contained between the two windscreen pillars 14 which laterally protrude superiorly from the rear ends of the respective front flanks 10 up to touch the roof 8.

The rear window 12 joins inferiorly with the rear bonnet 13 and superiorly with the roof 8. The rear window 12 further extends between the rear flanks 11.

The passenger compartment 5 is thus bounded at the front by the windscreen 9 and at the rear by the rear window 12; in the example shown in the enclosed figures, the passenger compartment 5 comprises four positions thus defined:

a front driver's position 15;

a front passenger's position 16; and possibly two rear passenger's positions 17.

The passenger compartment 5 could be two-seater, i.e. only comprising the front driver's position 15 and the front passenger's position 16.

Each driver's position 15 or front 16 or rear 17 passenger's position has a respective seat (of the known type and not shown).

The vehicle 1 comprises a battery pack 18 mounted at, in particular on board, the floor 6. The battery pack 18 comprises the electrochemical cells that globally define the battery of a powertrain system.

In particular, the battery pack 18 is incorporated in the floor 6, according to what disclosed in European Patent EP3674122, to which entire reference is made for what non disclosed hereinafter.

Preferably, the floor 6 comprises a front portion 19 and an opposite rear portion 20.

The front portion 19 supports, superiorly, the front seats, i.e. the driver's position 15 and the front passenger's position 16.

In the non-limiting embodiments of the enclosed figures, the battery pack 18 is subdivided in a front portion 21 and a rear portion 22, arranged on the front portion 19 and rear portion 20 of the floor 6 respectively.

In case there is no interest in rear positions 17, the rear position 22 of the battery pack 18 has a sensibly greater height than the height of thickness of the front portion 21 of the battery pack 18. This is due to the fact that the front part of the floor 6 is indeed under the passenger compartment 5, wherein the living space of the vehicle passengers is obtained and wherein the relative seats are housed.

Alternatively, the battery pack 18 is one piece, i.e. with no interruption between the front portion 21 and the rear portion 22.

Even if no thermal motor is shown in the herein attached figures, it can be housed at the front of the car, or at the rear of the battery pack, defining a configuration wherein the rear portion 22 is interposed between the thermal motor and the car seats.

The lower part of the floor 6 comprises a so-called bottom 23, which consists in a sheet made of metal or high-strength composite material. The bottom 23 is exposed outwardly and faces the ground on which the car 1 rests.

Figure 3:
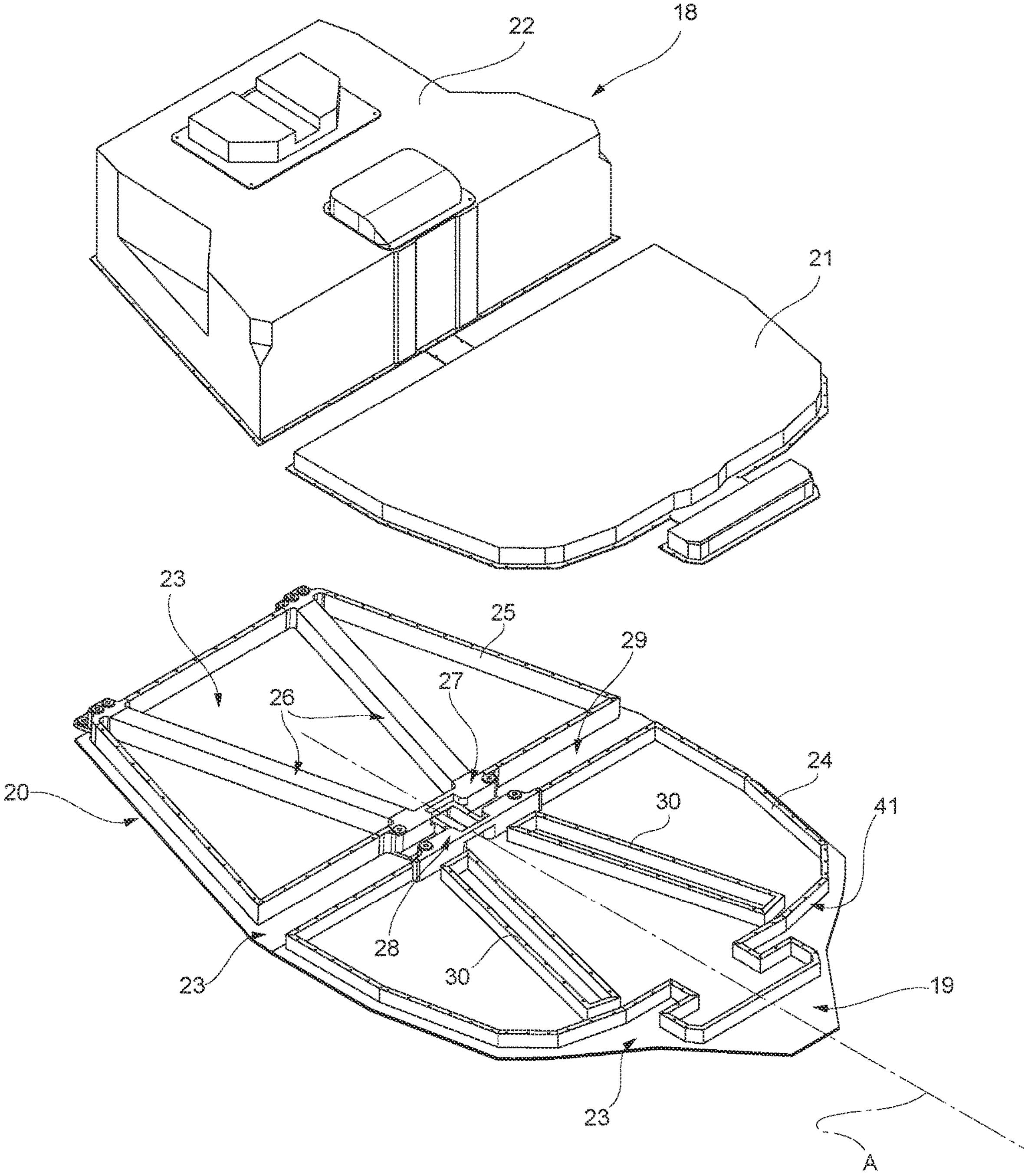
FIG. 3 is a perspective, schematic and exploded view, with parts removed for clarity's sake, of the battery pack of FIG. 2.
Figure 4:
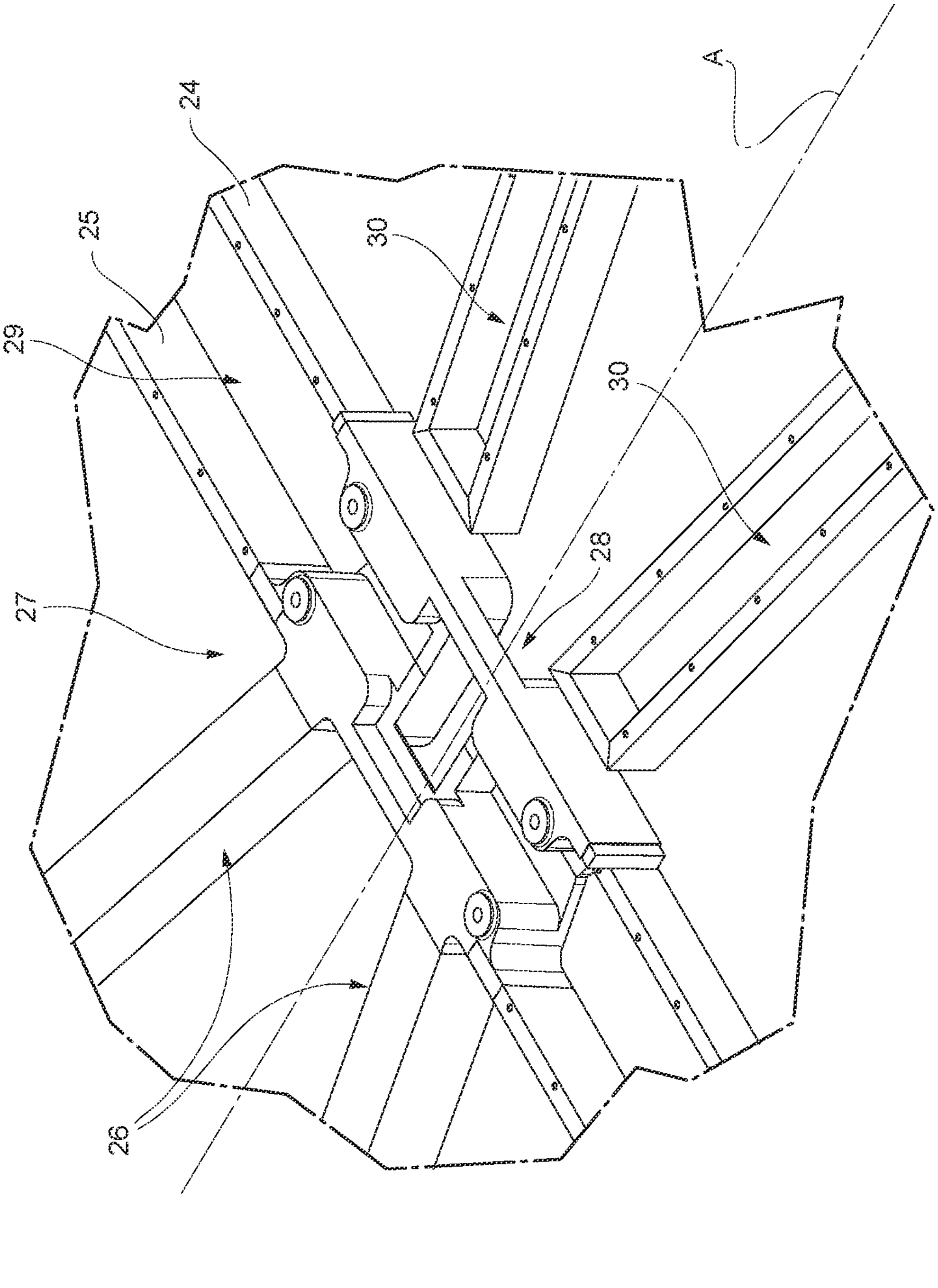
FIG. 4 is a perspective and enlarged view of a detail of FIG. 3.
Figure 5:
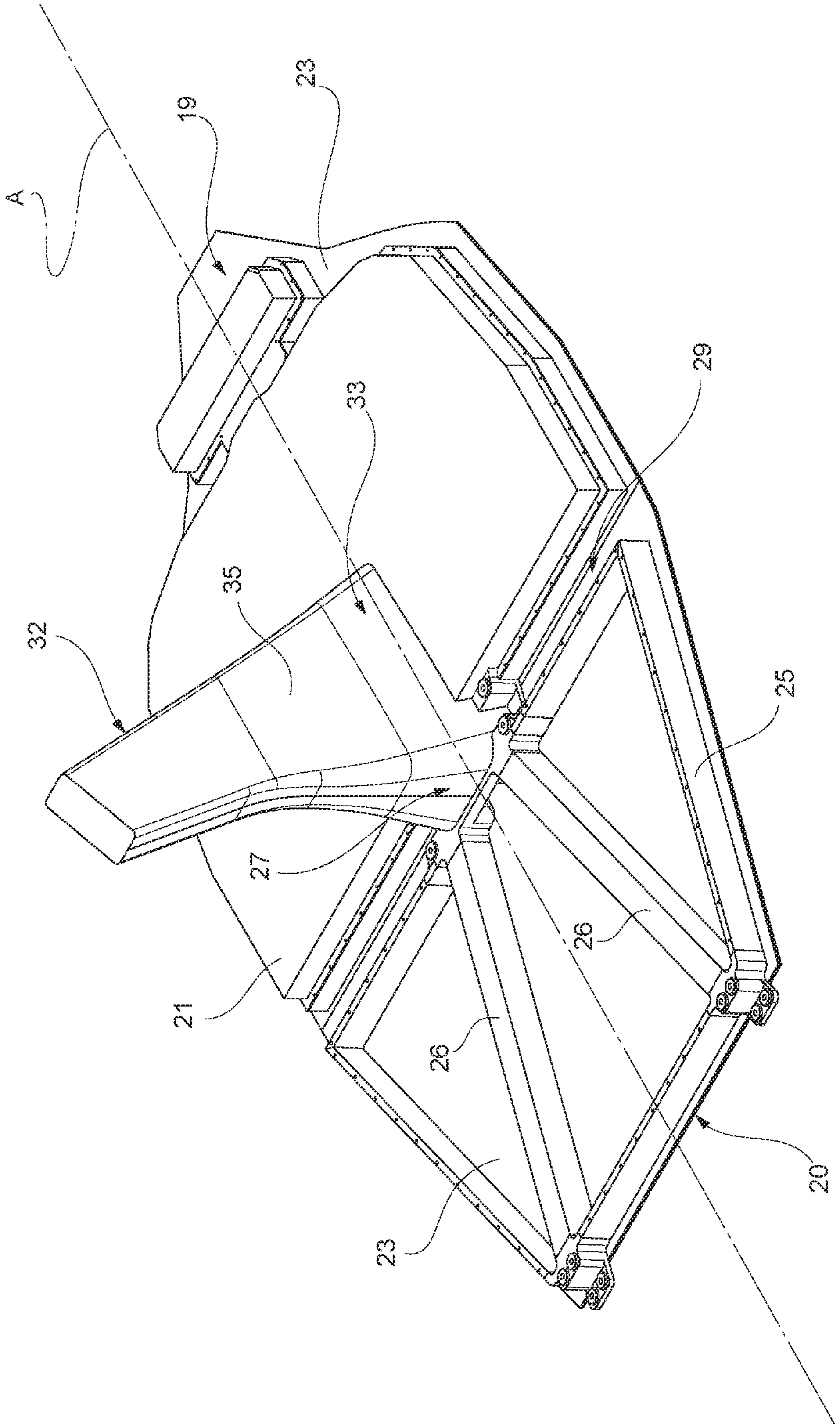
FIG. 5 is a rear perspective view of the inner structure of FIG. 2.

In the non-limiting embodiment of FIG. 3, protection frames 24 and 25, front and rear respectively, are further visible, respectively associated to the upper face of the front portion 19 and rear portion 20 of the floor 6. In particular, such frames outline the floor 6 peripherally. They are preferably made with a box-shaped element with a rectangular section (on a vertical plane) suitably shaped to follow the perimeter of the portions 19 and 20 of the floor 6.

Advantageously, the floor 6 comprises a vehicle chassis portion, wherein said portion comprises a structural composition with mutually complimentary triangles.

In particular, such chassis portion comprises a front cross-member 41 which extends from one side to the other of the car 1 between a driver's position 16 and command pedals and a central cross-member 29, which extends from one side to the other of the car and is immediately arranged behind or under the driver's position 16. The cross-members 29 and 41 are parallel to the transverse axis of the car 1.

At the rear portion 20, in particular inside the frame 25, the floor 6 comprises two oblique side members 26 which converge from the rear angles of the car 1 towards a central portion 27 of the floor 6, which, preferably, comprises a central node 28 wherein different structural elements of the vehicle chassis converge. Each of the side members 26 has an end mounted at the central node 28.

The term "oblique" refers respectively to the longitudinal axis X of the car.

In particular, the side members 26 (and also those hereinafter described), have a longitudinal shape preferably made by means of a tubular element with a square or rectangular section made of high-strength material. More particularly, unlike the other structural elements converging in the central node 28 which are described hereinafter, the oblique side members 26 are made in a single piece with the floor 6.

Preferably, also the frames 24 and 25 converge to the central node 28, thus stiffening the structure. Obviously, respective side members and cross-members could be arranged in the place of frames 24 and 25 to structurally provide the same kind of support.

In particular, in alternative or in addition, the car 1 comprises the central cross-member 29, which is parallel to the axis Y and is arranged so as to be crossed by the central node 28. Such a cross-member 29 is preferably, though non limitedly, defined by the portions of the frame 24 and 25 at the central portion 27.

At the front portion 19, in particular inside the frame 24, more in particular between the front cross-member 41 and the central cross-member 26, the floor 6 comprises two oblique side members 30 which converge from the front angles of the car 1 towards the central portion 27 of the floor 6, i.e. towards the central node 28. Each of the side members 26 has an end mounted at the central node 28.

Advantageously but non limitedly, the side members 26, 30 are fixed to the central node by fasteners of the known type (such as bolts or are welded) to the central node 28.

Therefore, the floor 6 comprises a composition with structural triangles given by the combination of the frames 25 and 25 with the side members 26, 30 and the possible cross-member 29.

In some non-limiting cases, the oblique side members 26, 30 are made in a single piece with the rest of the vehicle chassis. In other non-limiting cases, at least part of the floor 6 can be removed to replace at least part of the battery pack 18, for instance all the floor 6 or also only the front portion 19.

The oblique side members 26, 30 (especially the rear side members 26) are part of the vehicle chassis as, either removable or not, they cooperate therewith in order to absorb the stresses transferred to the chassis both by the suspensions, and possibly by an impact against external objects.

Inside the passenger compartment 5 there is also a central tunnel 31 arranged on the floor 6 and extending between a driver's position 15 and the front passenger's position 16 (i.e. at the front of the central node 28).

Advantageously, the car 1 further comprises inside the passenger compartment 5 a central pillar 32 extending between the floor 6 and the roof 8 and arranged at an intermediate longitudinal axis A of the passenger compartment 5 between the driver's position 15 and the front passenger's position 16.

In particular, the central node 28 lies at the centre of the car 1, i.e. at the longitudinal axis A.

Preferably, the central pillar 32 extends from the floor 6 to the roof 8. In particular, the central pillar 32 has a first end 33, integrally mounted (in particular fixed according to known techniques) to the central node 28, and a second end 34, mounted to the roof.

In particular, the central pillar 32 extends globally inside the passenger compartment 5.

Preferably, thus, at least one end of the four side members 26, 30 and of the central pillar 32 converges at the central node 28.

In the specific case shown in the enclosed figures, the central pillar 32 has a main portion 35 shaped as a plate (in particular as a flattened column or truncated-cone), parallel to the longitudinal axis A, and an upper end portion 36 which widens (or branches out) towards the roof 8 from the main portion 35.

The central pillar 32 is further interposed between respective seatbacks of the front seats and extends from the central node 28 towards the roof 8 inclined at the rear.

Thanks to the arrangement of the central pillar 32 inside the passenger compartment 5, each front flank 10 and the corresponding rear flank 11 delimit between them and with the floor 6 and the roof 8 a single totally free side door compartment 37, i.e. the port of which has no interruptions.

Each side door compartment 37 is also delimited laterally by the respective windscreen pillar 14.

Preferably, as visible in the example of the enclosed figures, the roof 8 has a central portion 38 that is laterally tapered relative to a front portion 39 and a rear portion 40; the central pillar 32 is arranged at the tapered central portion 38 of the roof 8.

Advantageously, the central pillar 32 defines along its opposite sides respective anchorage mountings for seat belts restraint systems (known in themselves and not shown) for the driver's position 15 and the front passenger's position 16.

Advantageously, the anchorage between the first end 33 of the pillar 32 to the central node 28 makes it possible to further stiffen the car 1 structure, providing a stable and robust anchorage point for the central pillar 32, which thereby defines a rigid connection between the floor 6 (and the battery pack 18) and the roof 8.

After examining the characteristics of the car 1 made according to the present invention, the advantages that it allows to obtain are evident.

In particular, in the herein set forth solution, the central pillar 32, which subdivided the side door compartments in the known solutions, is not removed but is placed at the centre of the passenger compartment 5.

It is therefore possible to make a single side door compartment 37 for each side of the car 1 (facilitating access into and exit out of the passenger compartment 5, in case of 5-seater vehicle) without the undesired consequences. In fact, the central pillar 32 can still be used to anchor the seat belt restraint systems for the driver's 15 and the front passenger's 16 positions; the only difference from the known cars is that the driver's seat belts are placed on the right rather than on the left (for a car with the driver's position on the left) and the opposite occurs for the passenger placed at the front. This change affects very little the driver and the passengers as the positioning inversion of the seat belts already occurs in all the cars when passing from left seats to right seats relative to the centre line.

Furthermore, positioning the pillar 32 at the centre of the car 1 allows to strengthen the part of the roof 8 which is traditionally very weak, allowing for an improved architecture for the chassis/shell of the car 1.

In addition, it is clear that connecting the central pillar 32 directly to the central node 28 allows to make a further robust and improved structure in case of electric or hybrid vehicles. In particular, such a solution allows to maintain the required structural stiffness reducing the overall weight of the car, which would otherwise require a heavier central pillar and central tunnel.

Although the above-described invention makes particular reference to a very precise embodiment, it shall not be deemed as limited to that embodiment, since all those variations, modifications or simplifications covered by the appended Claims, such as a different shape of the floor, a different way of connecting side members o a different battery pack, fall within its scope.

LIST OF REFERENCE NUMBERS OF THE FIGURES

1 car
2 front wheels
3 rear wheels
4 outer body
5 passenger compartment
6 floor
7 front bonnet
8 roof
9 windscreen
10 front flanks
11 rear flanks
12 rear window
13 rear bonnet
14 windscreen pillars
15 driver's position
16 front passenger's position
17 rear passenger's position
18 battery pack
19 front portion
20 rear portion
21 battery pack front portion
22 battery pack rear portion
23 bottom
24 protection frame
25 protection frame
26 side members
27 central portion
28 central node
29 central cross-member
30 front side members
31 central tunnel
32 central pillar
33 first pillar end
34 second pillar end

35 main portion
36 upper end portion
37 side door compartment
38 tapered portion
39 roof front portion
40 roof rear portion
41 front cross-member
A intermediate longitudinal axis
D advancement direction
X axis
Y axis
Z axis

The invention claimed is:

1. Electric or hybrid car (1) comprising:

a pair of front wheels (2) and a pair of rear wheels (3);

an outer body (4) having a floor (6), a front bonnet (7), a roof (8), and a windscreen (9) extending between the front bonnet (7) and the roof (8); and a passenger compartment (5) formed within said outer body (4) between said front and rear wheels (2, 3), bounded at the front by said windscreen (9) and defining at least one driver's position (15) and one front passenger's position (16) side by side;

wherein the floor (6) comprises at least one pair of oblique side members (26, 30) converging from a front portion (19) and/or from a rear portion (20) of the floor (6) towards a central portion (27) of the floor (6), which comprises a central node (28) to which one end of each oblique side member (26, 30) is mounted;

characterised in that it further comprises a central pillar (32) extending within said passenger compartment (5) between said floor (6) and said roof (8) and arranged in correspondence with an intermediate longitudinal axis (A) of said passenger compartment (5) between said driver's position (15) and said front passenger position (16); wherein said central pillar (32) comprises a first end (33) connected to said central node (28) and a second end (34) connected to said roof (8); and wherein at least a portion of the central pillar (32) extends between said driver's position (15) and said front passenger position (16) to at least partially separate said driver's position (15) and said front passenger position (16).

2. The car (1) according to claim 1, wherein said outer body (4) further comprises two front flanks (10) extending to opposite sides of said front bonnet (7), and two opposing rear flanks (11) aligned with, and spaced from, said respective front flanks (10) and in which each of said front flank (10) and the corresponding rear flank (11) delimit between themselves and with said floor (6) and said roof (8) a single, totally free side door compartment (37).

3. The car (1) according to claim 2, wherein said outer body (4) further comprises two windscreen pillars (14) which laterally contain said windscreen (9) and protrude superiorly from said respective front sides (10) up to touch said roof (8), and wherein each of said single side door compartment (37) is also delimited laterally by said windscreen pillar (14).

4. The car (1) according to claim 1, wherein said central pillar (32) has a main portion (35) substantially plate-shaped, parallel to said longitudinal axis (A), and an upper end portion (36) which widens towards said roof (8) from said main portion (35).

5. The car (1) according to claim 1, wherein said passenger compartment (5) has, between said driver's seat (15) and said front passenger's seat (16), a central tunnel (31); and wherein said central pillar (20) crosses said central tunnel (31) to extend from said central node (28) to said roof (8).

6. The car (1) according to claim 1, wherein said roof (8) has a central portion (38) laterally tapered with respect to a front portion (39) and a rear portion (40); and wherein said central pillar (32) is arranged in correspondence with said tapered central portion (38) of said roof (8).

7. The car (1) according to claim 1, wherein said passenger compartment (5) further comprises at least two rear passenger seats (17) arranged on opposite sides of said longitudinal axis (A).

8. The car (1) according to claim 1, wherein said floor (6) comprises at least four slanted side members (26, 30), of which one pair of rear side members (26) and one pair of front side members (30).

9. The car (1) according to claim 8, wherein the floor (6) comprises a front cross-member (41) extending transversely from side to side of the automobile; wherein the pair of front side members (30) extends from the front cross-member (41) converging at the centre node (28).

10. The car (1) according to claim 1, wherein said floor (6) accommodates at least one battery pack (18), in particular surrounding the oblique side members (26, 30).

11. The car (1) according to claim 10, wherein said battery pack (18) comprises a plurality of cylindrical batteries arranged with their own axis of rotation perpendicular to a plane of said floor (FL), so as to occupy all available space within at least one triangular structure.

* * * * *